(12) United States Patent
Tamborski et al.

(10) Patent No.: US 10,915,380 B2
(45) Date of Patent: Feb. 9, 2021

(54) GLOBAL COORDINATION OF IN-PROGRESS OPERATION RISKS FOR MULTIPLE DISTRIBUTED STORAGE NETWORK MEMORIES

(71) Applicant: International Business Machines Corporation, Armonk, NY (US)

(72) Inventors: Patrick A. Tamborski, Chicago, IL (US); Bart R. Cilfone, Marina del Rey, CA (US); Alan M. Frazier, Palatine, IL (US); Sanjaya Kumar, South Elgin, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 16/036,431

(22) Filed: Jul. 16, 2018

(65) Prior Publication Data

US 2020/0019447 A1 Jan. 16, 2020

(51) Int. Cl.
*G06F 9/54* (2006.01)
*G06Q 10/06* (2012.01)
(Continued)

(52) U.S. Cl.
CPC .......... *G06F 9/542* (2013.01); *G06F 16/907* (2019.01); *G06F 17/16* (2013.01); *G06F 17/18* (2013.01);
(Continued)

(58) Field of Classification Search
CPC ........ G06F 9/542; G06F 16/907; G06F 17/16; G06F 17/18; H04L 67/1097; G06Q 10/0635; G06N 5/00
See application file for complete search history.

(56) References Cited

U.S. PATENT DOCUMENTS

| | | | |
|---|---|---|---|
| 8,386,834 B1 * | 2/2013 | Goel | G06F 11/0727 714/6.1 |
| 8,910,022 B2 * | 12/2014 | Grube | H04L 41/0803 714/770 |

(Continued)

OTHER PUBLICATIONS

Tamborski et al., "Catastrophic Data Loss Prevention by Global Coordinator", U.S. Appl. No. 16/057,561, filed Aug. 7, 2018.
(Continued)

*Primary Examiner* — Doon Y Chow
*Assistant Examiner* — Phuong N. Hoang
(74) *Attorney, Agent, or Firm* — James Nock; Andrew D. Wright; Roberts Calderon Safran & Cole, F.C.

(57) ABSTRACT

A method for coordinating management of operation risks in a distributed storage network (DSN) that includes multiple distributed computing systems including DSN memories begins with a global coordinating unit receiving messages including metadata from managing units associated with the multiple distributed computing systems. The method continues with the global coordinating unit determining, based on the metadata, that storage units in one or more of the distributed computing systems are executing or planning to execute an operation that could result in data loss or data outage. The method continues with the global coordinating unit transmitting an alert, including a command to halt the operation at the affected distributed computing systems.

13 Claims, 8 Drawing Sheets

(51) Int. Cl.
  *G06N 5/00* (2006.01)
  *G06F 17/18* (2006.01)
  *H04L 29/08* (2006.01)
  *G06F 17/16* (2006.01)
  *G06F 16/907* (2019.01)

(52) U.S. Cl.
  CPC ........... *G06N 5/00* (2013.01); *G06Q 10/0635* (2013.01); *H04L 67/1097* (2013.01)

(56) References Cited

U.S. PATENT DOCUMENTS

| | | | | |
|---|---|---|---|---|
| 9,086,994 | B2* | 7/2015 | Resch | G06F 11/1004 |
| 9,170,868 | B2* | 10/2015 | Dhuse | G06F 11/3476 |
| 2005/0086643 | A1* | 4/2005 | Shane | G06F 11/36 |
| | | | | 717/124 |
| 2006/0236198 | A1* | 10/2006 | Lintz, Jr. | G06F 11/0727 |
| | | | | 714/758 |
| 2007/0050417 | A1* | 3/2007 | Hasegawa | G06F 11/0727 |
| 2011/0225360 | A1* | 9/2011 | Baptist | G06F 3/064 |
| | | | | 711/114 |
| 2013/0117529 | A1* | 5/2013 | Motwani | G06F 3/067 |
| | | | | 711/173 |
| 2014/0136901 | A1* | 5/2014 | Butler | G06F 11/3051 |
| | | | | 714/38.1 |
| 2015/0006594 | A1* | 1/2015 | Volvovski | G06F 11/10 |
| | | | | 707/827 |
| 2016/0224432 | A1* | 8/2016 | Junqueira | G06F 8/71 |
| 2017/0093978 | A1* | 3/2017 | Cilfone | G06F 3/0619 |
| 2017/0192692 | A1* | 7/2017 | Baptist | G06F 3/0665 |
| 2017/0286088 | A1 | 10/2017 | Litvinsky | |
| 2018/0004449 | A1 | 1/2018 | Cilfone et al. | |
| 2018/0018230 | A1 | 1/2018 | Leggette | |
| 2018/0373521 | A1* | 12/2018 | Huang | G06F 8/65 |

OTHER PUBLICATIONS

List of IBM Patents or Patent Applications Treated as Related. Filed Sep. 12, 2018, 1 page.
List of IBM Patents or Applications Treated as Related, Jul. 16, 2018, 1 page.
List of IBM Patents or Applications Treated as Related, Aug. 7, 2018, 2 pages.

* cited by examiner

GLOBAL COORDINATION OF IN-PROGRESS OPERATION RISKS FOR MULTIPLE DISTRIBUTED STORAGE NETWORK MEMORIES

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
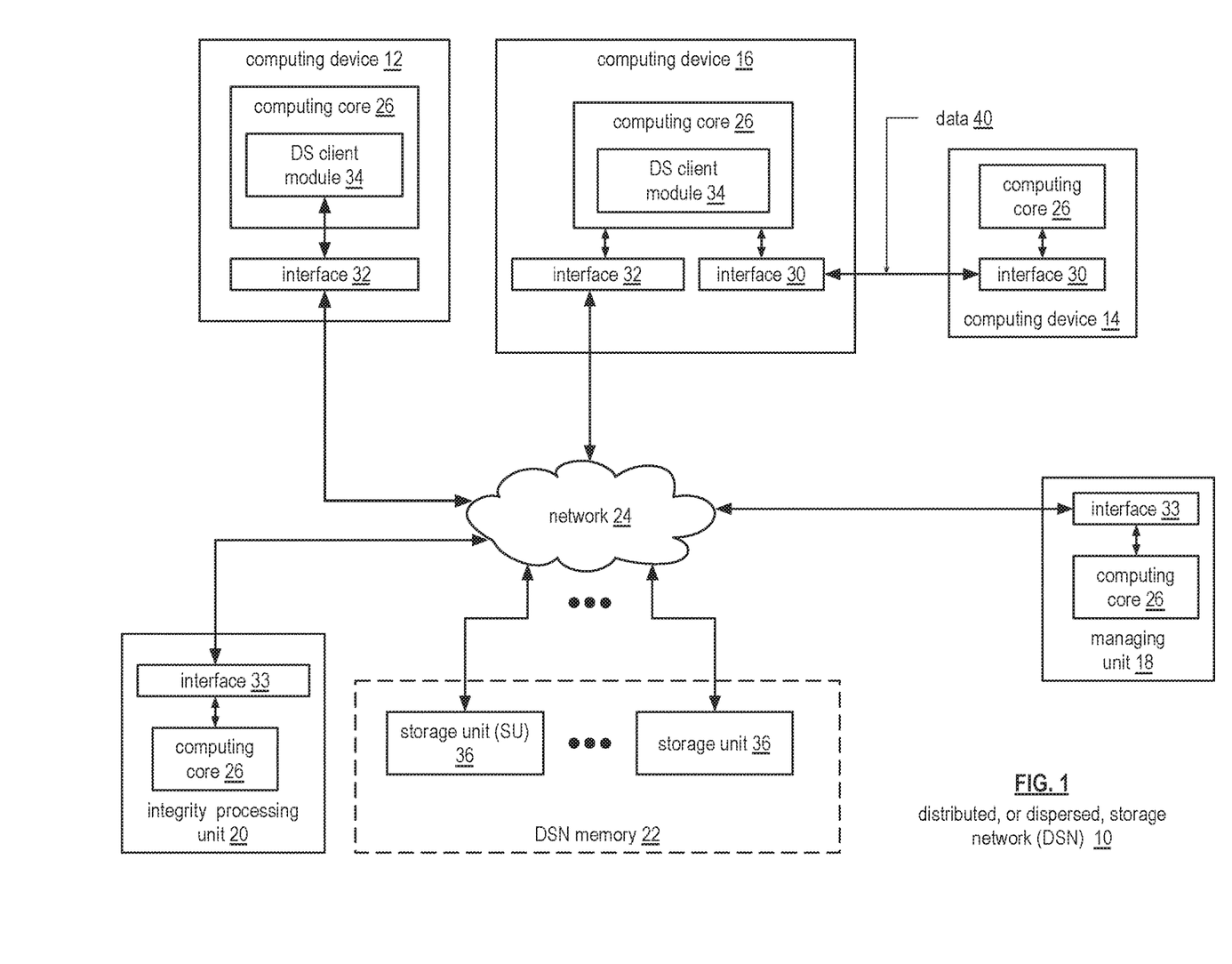
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
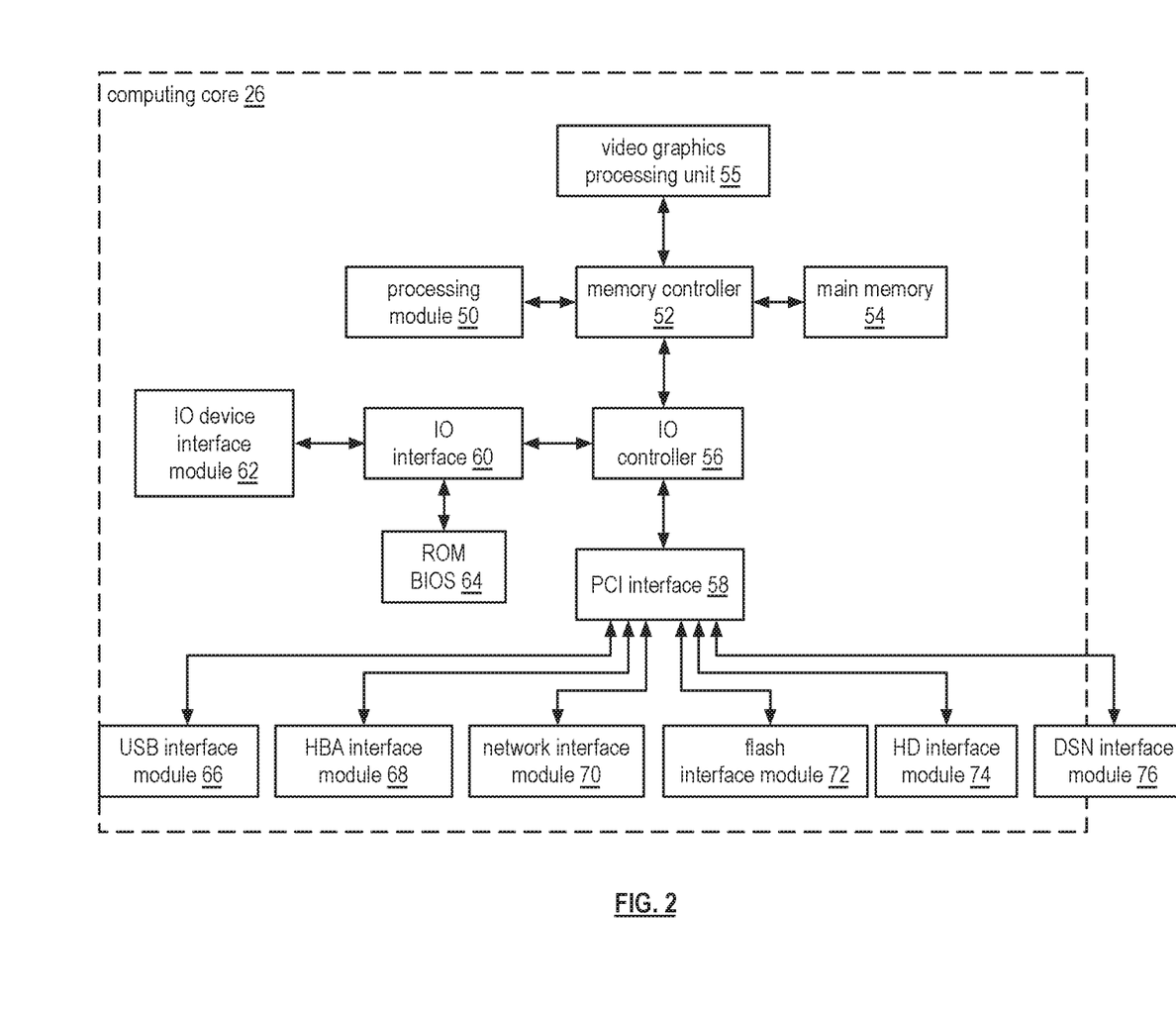
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
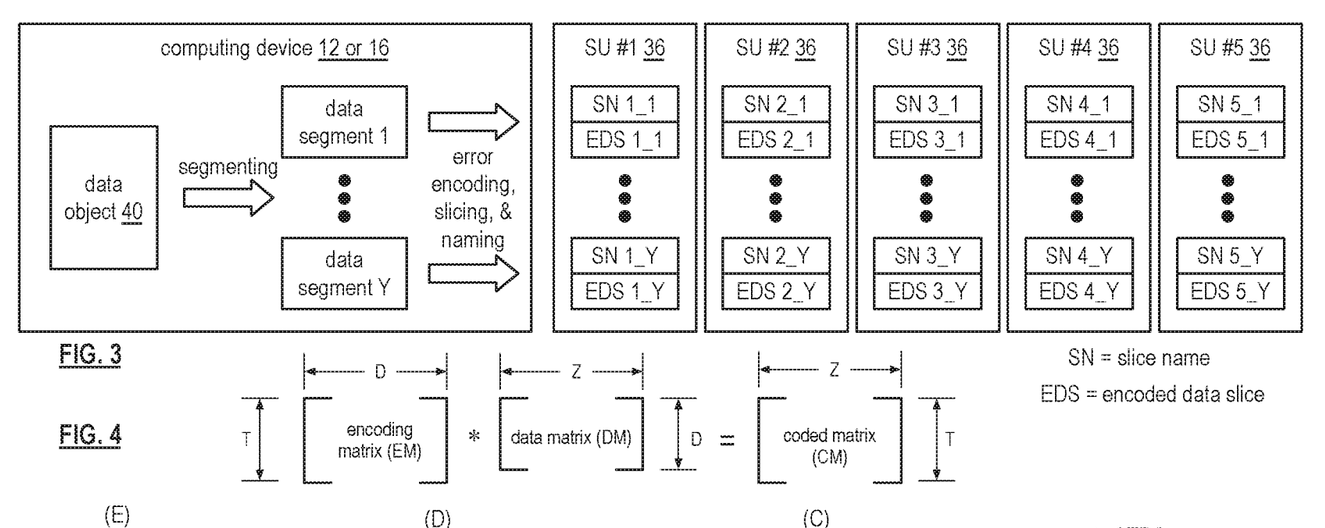
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
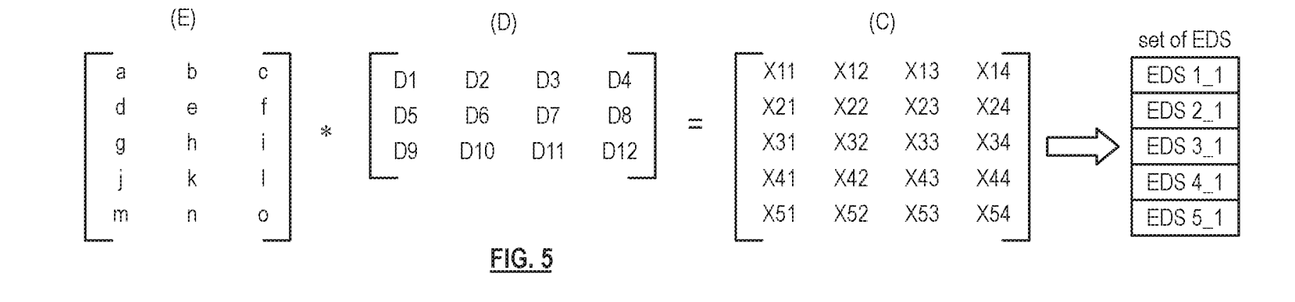
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
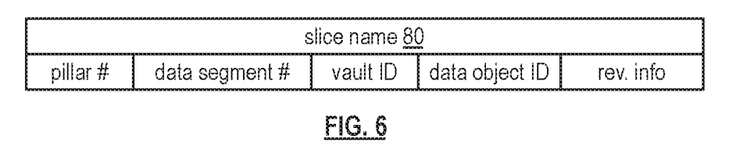
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
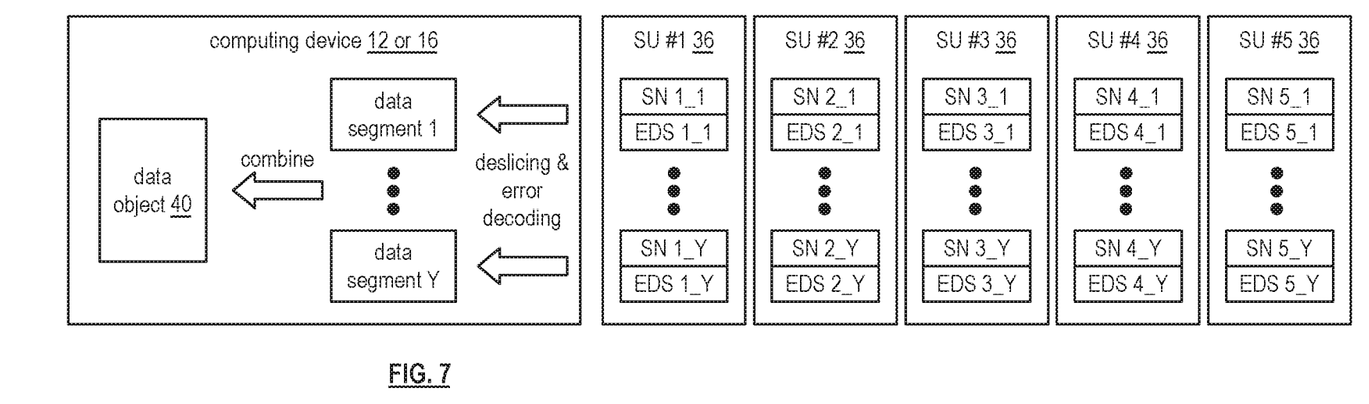
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
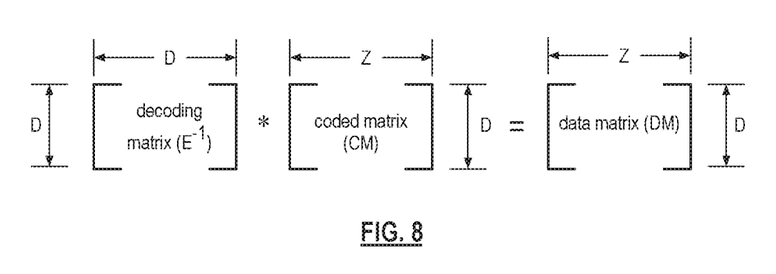
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
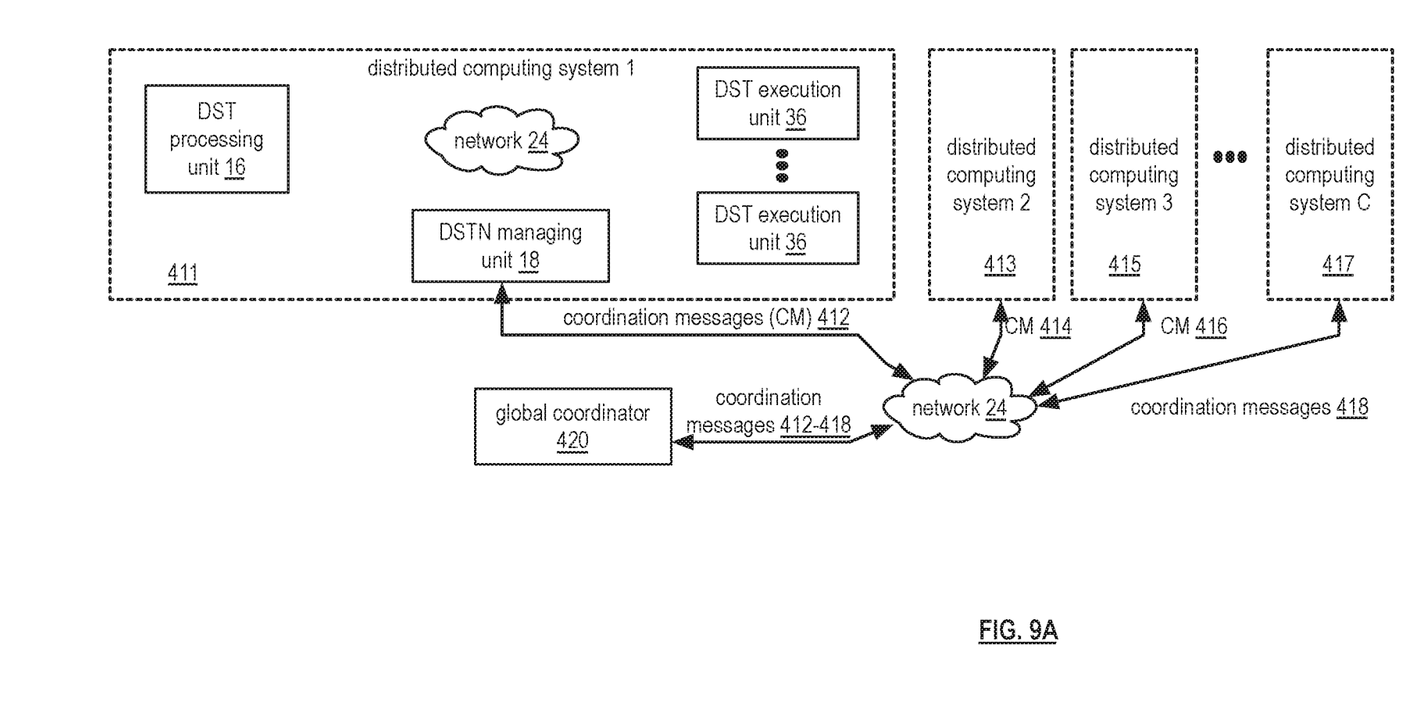
FIG. 9A is a schematic block diagram of an embodiment of a plurality of distributed computing systems that includes a global coordinator in accordance with the present invention.

FIG. 9A is a schematic block diagram of an embodiment of a plurality of distributed computing systems that includes a global coordinator, the network 24 of FIG. 1, and a plurality of distributed computing systems 1-C. The global coordinator may be implemented utilizing one or more of a processing module, the distributed storage and task (DST) processing unit 16 of FIG. 1, the distributed storage and task network (DSTN) managing unit 18 of FIG. 1, and a computing server. Each distributed computing system may be implemented utilizing the distributed computing system 10 of FIG. 1. Each distributed computing system includes one or more of the DST processing unit 16 of FIG. 1, the network 24 of FIG. 1, the DSTN managing unit 18 of FIG. 1, and a plurality of DST execution units 36. The plurality of distributed computing systems 411, 413, 415, and 417 function to coordinate themselves in conjunction with a global coordinator 420.

In general, FIG. 9A illustrates a system that employs a protocol that defines communication between the DSN memory and a global coordinator 420. In some embodiments, the manager for the DSN memory may be configured to periodically connect to the global coordinator. The manager can initiate the connection at periodic intervals rather than the manager receiving in-bound connections from the global coordinator. The connection may be established using a well-defined hostname, IP address, or other network identifier.

Upon the connection of a manager from a particular DSN memory to the global coordinator the global coordinator can record a public key (or the fingerprint thereof) from the certificate of the manager. In some embodiments, the manager must also authenticate against the global coordinator correctly before interacting in any way, such as scheduling or dictating the connection of items. The global coordinator 420 can respond with updates which may include things such as: lists of logs to collect and return, messages and alerts, upgrader payloads or software patches, configuration parameters to apply. Once the manager receives the response from the global coordinator 420, the manager parses response and begins the process of collecting and returning items that were requested. The global coordinator then makes the data received from the manager available for other applications to read, analyze, and correlate.

In a more specific example of operation of the coordinating of the plurality of distributed computing systems, a DSTN managing unit 18 of a distributed computing system 411 initiates a connection to the global coordinator to support subsequent coordination messages 412, where the plurality of distributed computing systems 411, 413, 415, and 417 includes the distributed computing system 411. The initiating includes from time to time, issuing, via the network 24, a connection message 412, 414, 416, and 418 from distributed computing systems 411, 413, 415, and 417 to the global coordinator 420, where connection messages 412, 414, 416, and 418 may include one or more of a host name, and Internet protocol address, a distributed computing system identifier, and security information (e.g., a signed certificate from the global coordinator, a current public key of a public/private key pair associated with the distributed computing system). Industry protocol such as TLS, SSH, and/or HTTPS may be utilized for enhanced security of the connection.

With a connection initiated by DSTN managing unit 18, the global coordinator 420 generates a list of one or more requests, where each request includes an information gathering task for execution by the distributed computing system 411. The information to be gathered includes one or more of activity logs, user records, messages, alerts, error messages, billing information, performance information, security information, and authentication information. The generating of the list may be based on one or more of interpreting a schedule, interpreting an error message, interpreting a global coordinator manager input, interpreting a performance guideline, and interpreting a request.

Having generated the list of the one or more request, the global coordinator 420 obtains updates for the distributed computing system 411. The updates can include one or more of a software update, an updated configuration parameter, updated authentication information, updated security information, updated billing information, and/or a summary of previously gathered information from one or more other distributed computing systems. The obtaining may be based on one or more of interpreting a schedule, interpreting a performance trend, interpreting a request, interpreting a distributed task execution resource availability level, and interpreting a storage availability level.

Having obtained the updates, the global coordinator 420 issues coordination messages 412 to the distributed computing system 411, where the coordination messages 412 include at least some of the list of the one or more requests and at least some of the updates for the distributed computing system. Having received the coordination messages 412, the distributed computing system 411 performs one or more of the requests to generate one or more responses to send to the global coordinator 420 and executes and updating process to incorporate at least some of the updates of the coordination messages 412.

Figure 9B:
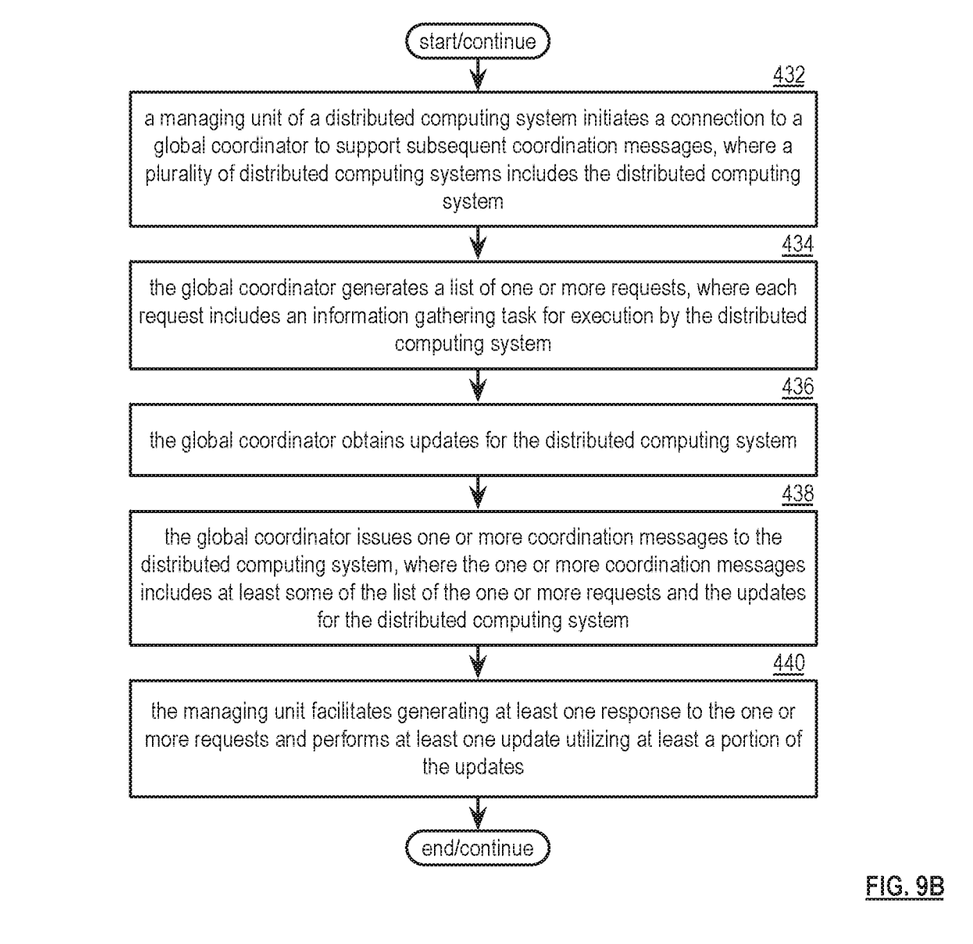
FIG. 9B is a flowchart illustrating an example of coordinating a plurality of distributed computing systems in accordance with the present invention.

FIG. 9B is a flowchart illustrating an example of coordinating a plurality of distributed computing systems. The method begins or continues at block 432, where a managing unit of a distributed computing system initiates a connection to a global coordinator to support subsequent coordination messages, where a plurality of distributed computing systems includes the distributed computing system. The initiating of the connection includes, from time to time, issuing a connection message to the global coordinator, where the connection message may include one or more of a host name, and Internet protocol address, a distributed computing system identifier, and security information.

The method continues at block 434, where the global coordinator generates a list of one or more requests, where each request includes an information gathering task for execution by the distributed computing system. The generating may be based on one or more of interpreting a schedule, interpreting an error message, interpreting a global coordinator manager input, interpreting a performance guideline, and interpreting a request. In some embodiments, the global coordinator can generate a list of requests, or tasks, for one distributed computing system based, at least partially, on responses to coordination messages received from a different distributed computing system, or from a combination of such responses.

The method continues at block 436, where the global coordinator obtains updates for the distributed computing system. The obtaining may be based on one or more of interpreting a schedule, interpreting a performance trend, interpreting a request, interpreting a distributed task execution resource availability level, and interpreting a storage availability level. In some embodiments, updates selected for one distributed computing system may differ from updates selected for a different distributed computing system. In some cases, the selection can be based, at least in part, on previously received responses to coordination messages.

The method continues at block 438, where the global coordinator issues one or more coordination messages to the distributed computing system, where the one or more coordination messages includes at least some of the list of the one or more requests and the updates for the distributed computing system. The issuing includes, for a coordination message, generating the coordination message and sending the coordination message to the managing unit of the distributed computing system.

The method continues at block 440, where the managing unit facilitates generating at least one response to the one or more requests and performs at least one update utilizing at least a portion of the updates. The generating includes one or more of interpreting a request, generating a response, and sending the response to the global coordinator. The performing selecting an update for execution and executing the selected update (e.g., performing a required software update for at least a portion of the distributed computing system).

In an example, DSTN managing units 18 from FIG. 1 initiate connections with a global coordinator 420 from FIG. 9A by periodically sending messages to the global coordinator 420. The global coordinator 420 transmits a coordination message to each DSN managing unit 18 that initiates a connection. Each of the DSTN managing units 18 process the coordination message, in some cases assisting in completion of tasks indicated in the coordination message and transmits a response to the global coordinator 420. The global coordinator 420 makes the responses from the DSN managing units available for use by other applications.

Global coordinators 420 have authority to perform "near time" management duties that could also be associated with DSN managing units 18. The global coordinator is able to collect metadata associated with the DSN, including, but not limited to process health, device health, network health and/or the current state of each DSN unit's current state. In some cases interaction with an operator is not required. The global coordinator 420 can generate alerts targeted to operators (network management professionals, etc.) assigned to a particular DSN. Support cases can be automatically generated and compared to historical support cases and when substantially similar to one or more of the historical cases the global coordinator 420 can automatically transmit a response to managing units of affected DSNs without intervention by operators. The managing units can then execute an operation associated with the response (or not) as appropriate to the managing unit itself and/or any nodes under its managing responsibility.

Figure 10:
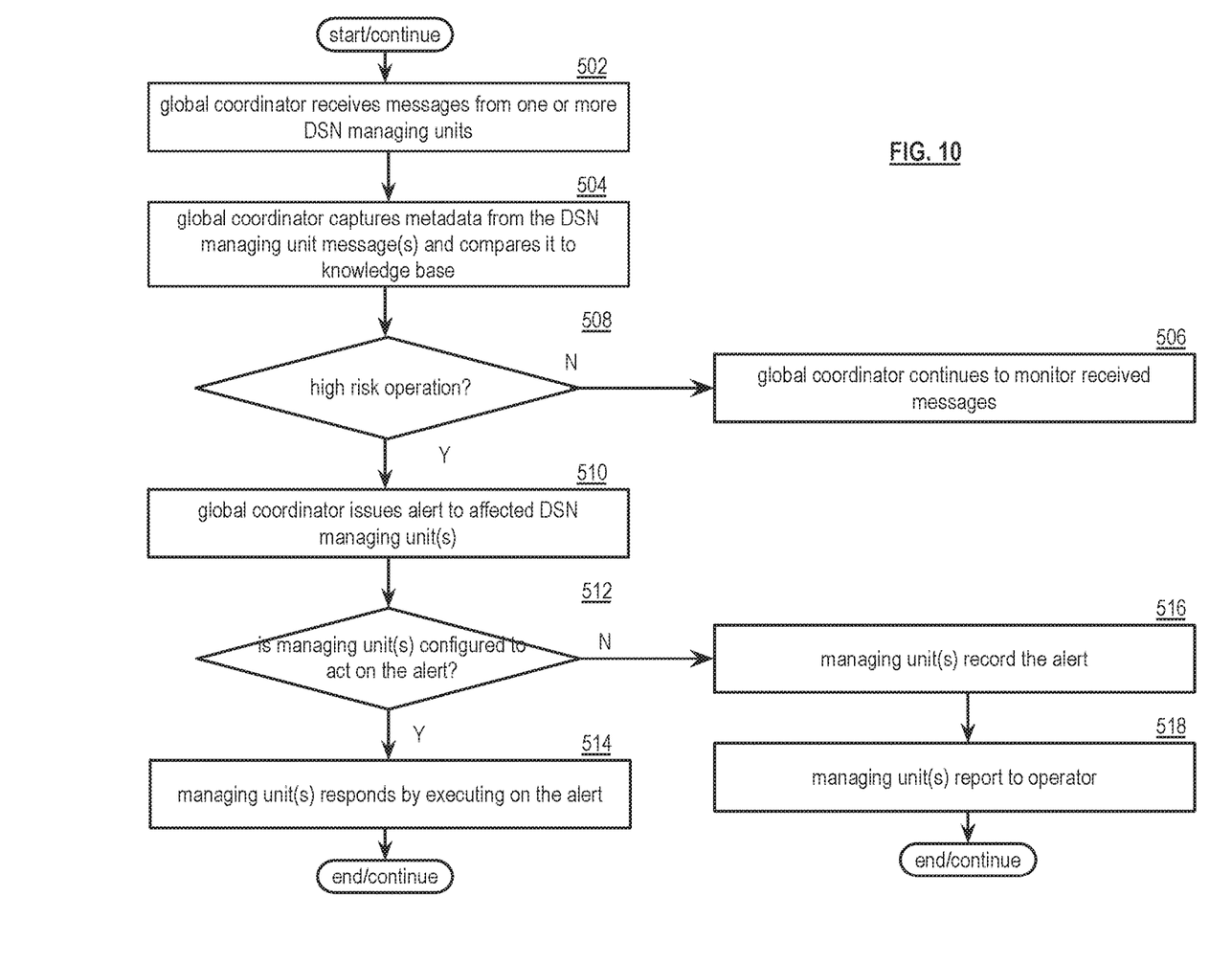
FIG. 10 is a logic diagram illustrating an example of a global coordinator recognizing and responding to a high-risk operation in accordance with the present invention.

FIG. 10 is a logic diagram illustrating an example of a global coordinator recognizing and responding to a high-risk operation. In the example method one or more DSN managing units periodically reports messages that are received at a global coordinator at step 502. At step 504 the global coordinator captures the metadata and the analytics engine associated with the global coordinator processes the captured metadata and compares it to previously determined problems from a compiled knowledge base or determines that the reporting DSN is out-of-date. Captured metadata indicating high-risk operations, include (but are not limited to) licensing abuse, exceeding of pre-determined or dynamically determined capacity limitations, violations of terms of service, security bugs, and software bugs. At step 508 the global coordinator determines whether a high-risk operation is either commencing or in progress (i.e. an operation that has a high risk of outage and/or data loss) and when the global coordinator determines that the operation is high risk, at step 510 the global coordinator transmits an alert to the affected DSN managing units. Alternatively, when the global coordinator fails to identify a high-risk operation, it continues its normal function monitoring received messages at step 506.

The alert may include a "solution" to the high-risk operation that may include an executable, a "halt" or "stop" command intended to immediately cease the problem operation(s). The method continues at step 512, when an affected DSN managing unit 18 interprets the alert to determines whether it is configured to respond. When the DSN managing unit is configured to respond to the alert, it executes the operation associated with the alert at step 514. When the DSN managing unit interprets the alert and determines it is configured to respond, the DSN managing unit can immediately disable the storage units within the DSN using established protocols, as appropriate.

When the DSN managing unit is not configured to respond to the alert the DSN managing unit records the alert at step 516 and reports relevant information to an affected operator at step 518. Relevant information can include a notice that insufficient storage space is available in storage units associated with the DSN managing unit. The DSN managing unit can be configured to respond to storage alerts (such as, for example that storage is approaching a minimum available capacity) from the global coordinator by automatically acquiring additional storage capacity. Configuration options available to the global coordinator can be included in a knowledge base associated with the global coordinator and/or be provided to a client as a potential sales notification.

Figure 11:
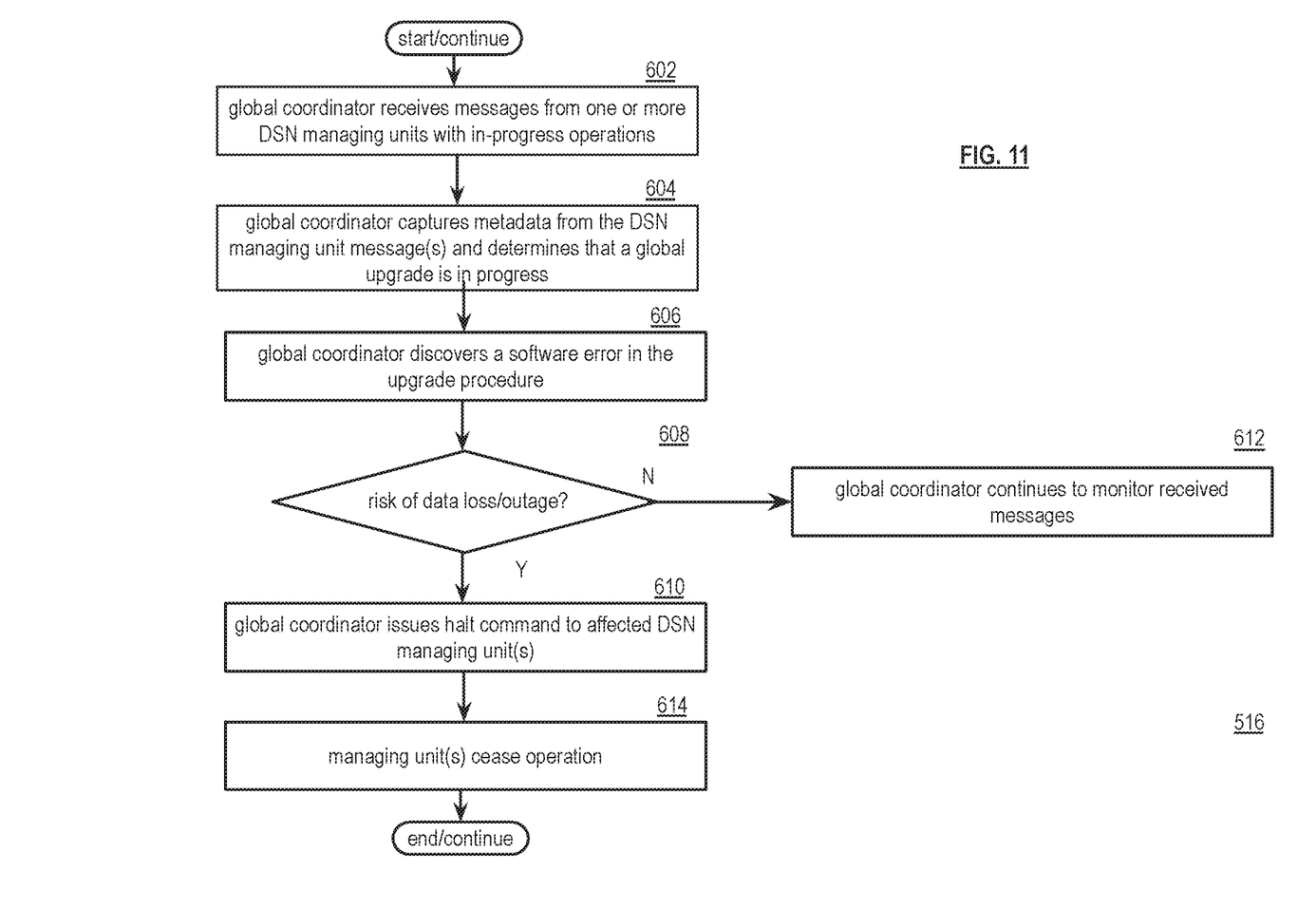
FIG. 11 is a logic diagram illustrating an example of a global coordinator responding to in-progress operation risks in accordance with the present invention.

FIG. 11 is a logic diagram illustrating an example of a global coordinator responding to in-progress operation risks. The method begins at step 602, where the global coordinator receives messages initiated by DSN managing units, where the managing units are associated with the plurality of distributed computing systems that includes sets of storage units (SUs). In an example, the messages are related to an in-progress operation, which can be a global upgrade operation, or any other operation that the global coordinator 420 recognizes as having potential for an outage or data loss in distributed computing systems (such as distributed computing systems 411-417 of FIG. 9A) associated with the DSN managing units.

The method continues at step 604, with the global coordinator captures messages relating to the in-progress operation(s) and determining that a global upgrade operation is in progress. In an example, the global coordinator has been notified that a global upgrade or other global operation is planned (or in-progress) and in a further example an operator has been assigned to manually monitor the upgrade progress. In another example, the global coordinator collects metadata associated with the received messages and determines that a global upgrade is in progress. In yet another example, the global coordinator determines that a global upgrade is in progress based on both metadata associated with the received messages and previous knowledge of a pending upgrade.

In practice, the global coordinator will be examining metadata and other received information to determine whether a potential or in-progress operation could cause data loss and/or an outage if applied to too many nodes simultaneously. The global coordinator is, thus, taking advantage of the inherent coordination between DSN elements to limit unfavorable impact on those DSN elements. Accordingly, some representative operations include (but are not limited to) reboot operations, diagnostic operations that can take a plurality of memory devices offline or any other task or operation that can be executed across a plurality of nodes substantially simultaneously. Any operation that could potentially cause a particular node to go offline can be evaluated by the global coordinator to determine whether the operation could potentially elevate the risk of a system wide (or a significant portion of the system) if allowed to run across a plurality of nodes.

At step 606 the global coordinator determines that the in-progress operation includes a software error/bug. In an example, the determination that a planned or in-progress operation includes a software error/bug can be based on a comparison of the collected metadata to a knowledge base of operations and/or operating conditions, where the knowledge base can include historical information regarding potentially high-risk operations. The global coordinator can also make use of external sources, such as a cognitive computing system to provide insight regarding the in-progress operation(s). At step 608 the global coordinator determines whether the discovered software bug results in the in-progress operation having an unacceptable potential for data loss and/or an outage, and when there is an unacceptable potential for data loss and/or an outage the method continues at step 610, the global coordinator can transmit an alert to each management unit of the plurality of managing units executing the in-progress operation and at step 614 the managing unit(s) cease operation. The alert can include an instruction to halt the in-progress operation. When the global coordinator determines that a discovered software bug results in the in-progress operation having an acceptable potential for data loss and/or an outage the monitoring continues at step 612.

A determination by the global coordinator that a planned or in-progress operation has an unacceptable potential for outage and/or data loss may be based on a comparison to previously determined thresholds. For example, the threshold for global coordinator could be that any bug in an operation is unacceptable, or in another example the threshold may allow some potential risk (such as a percentage risk of outage and/or data loss) before determining that the operation should be halted.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for use in a dispersed storage network (DSN) including a plurality of distributed computing systems, each computing system including a DSN memory, the method comprising:
   receiving, by a global coordinator, messages from a plurality of managing units associated with respective ones of the plurality of distributed computing systems, wherein each of the plurality of managing units manage a storage unit (SU) of a respective one of the plurality of distributed computing systems;
   initiating, by the global coordinator, connections between the global coordinator and the plurality of managing units based on receiving the messages;
   collecting, by the global coordinator, metadata from the messages of the plurality of managing units regarding one or more in-progress operations being executed by the plurality of managing units;
   determining, by the global coordinator, whether the metadata indicates that one or more SUs is executing a high-risk operation during a software upgrade procedure, wherein a high-risk operation is an operation having more than a pre-determined probability of a data loss;
   in response to a determination that one or more SUs is executing a high-risk operation during the software upgrade procedure, transmitting, by the global coordinator, an alert to each managing unit of the plurality of managing units executing the high-risk operation, wherein the alert includes an executable halt or stop command to immediately cease the high-risk operation during the software upgrade procedure by disabling the storage unit of each managing unit of the plurality of managing units; and
   monitoring, by the global coordinator, the software upgrade to determine whether the software upgrade has more than a pre-determined probability of an outage in one or more of the plurality of distributed computing systems,
   wherein the one or more in-progress operations are selected from a group consisting of: a reboot operation; a diagnostic operation that takes a plurality of memory devices of the DSN offline; and a task that is executed across a plurality of nodes of the DSN substantially simultaneously;
   and wherein the determining whether the metadata indicates that one or more SUs is executing the high-risk operation during the software upgrade procedure comprises determining that the one or more in-progress operations includes a software error or bug based on a comparison of the metadata to a knowledge base including information regarding potentially high-risk operations.

2. The method of claim 1, wherein the high-risk operation is an operation having more than a pre-determined probability of outage.

3. The method of claim 1, wherein the upgrade is a global software upgrade.

4. The method of claim 3, wherein the global coordinator determines that the global software upgrade includes one or more software errors.

5. The method of claim 1, further comprising:
   comparing, by the global coordinator, the metadata to a knowledge base, wherein the knowledge base includes information regarding high-risk operations.

6. A processing system configured to implement a distributed storage network (DSN) memory, the processing system comprising:
   at least one computing core and associated memory configured to implement a global coordination unit coupled to a plurality of managing units wherein each managing unit of the plurality of managing units is associated with a respective one of a plurality of distributed computing systems;
   the global coordination unit configured to:
   collect messages transmitted from each of the plurality of managing units, wherein the messages include metadata from each managing unit of the plurality of managing units regarding one or more in-progress operations being executed by the managing units;
   determine that a global software upgrade is in progress based on the metadata in the messages from the plurality of managing units;
   determine whether the metadata from one or more of the plurality of managing units indicates that one or more distributed computing systems is executing a high-risk operation during the global software upgrade, wherein a high-risk operation is an operation having more than a pre-determined probability of a data loss;
   in response to a determination that one or more distributed computing systems is
   executing a high-risk operation during the global software upgrade, transmit an alert to each managing unit of the plurality of managing units executing a high-risk operation, wherein the alert includes an executable halt or stop command to immediately cease the high-risk operation during the global software upgrade by disabling a storage unit of each managing unit of the plurality of managing units; and
   monitor the global software upgrade to determine whether the global software upgrade has more than a pre-determined probability of an outage in one or more of the plurality of distributed computing systems,
   wherein the one or more in-progress operations are selected from a group consisting of: a reboot operation; a diagnostic operation that takes a plurality of memory devices of the DSN offline; and a task that is executed across a plurality of nodes of the DSN substantially simultaneously;
   and wherein the determining whether the metadata from one or more of the plurality of managing units indicates that one or more distributed computing systems is executing the high-risk operation during the global software upgrade comprises determining that the one or more in-progress operations includes a software error or bug based on a comparison of the metadata to a knowledge base including information regarding potentially high-risk operations.

7. The processing system of claim 6, wherein the global coordination unit is further configured to:
   compare the metadata to a knowledge base, wherein the knowledge base includes information regarding high-risk operations.

8. The processing system of claim 6, wherein the high-risk operation is an operation having more than a pre-determined probability of outage.

9. The processing system of claim 6, wherein the global coordinator determines that the global software upgrade includes one or more software errors.

10. A distributed storage network (DSN) comprising:
    a plurality of distributed computing systems implementing a plurality of DSN memories, each of the plurality of DSN memories including a DSTN managing unit;
    a global coordinator coupled to the DSTN managing unit included in each of the plurality of DSN memories;
    the global coordinator including a computing core and configured to:
    collect messages transmitted from each of the plurality of managing units, wherein the messages include metadata from each managing unit of the plurality of managing units regarding one or more in-progress operations being executed by the managing units;
    determine whether the metadata from one or more of the plurality of managing units indicates that one or more distributed computing systems is executing a high-risk operation during a software upgrade procedure, wherein a high-risk operation is an operation having more than a pre-determined probability of a data loss;
    in response to a determination that one or more distributed computing systems is executing a high-risk operation during the software upgrade procedure, transmit an alert to each managing unit of the plurality of managing units executing a high-risk operation, wherein the alert includes an-executable halt or stop command to immediately cease the high-risk operation during the software upgrade procedure by disabling a storage unit of each managing unit of the plurality of managing units; and
    monitor the global upgrade to determine whether the global upgrade has more than a pre-determined probability of an outage in one or more of a plurality of distributed computing systems,
    wherein the one or more in-progress operations are selected from a group consisting of: a reboot operation; a diagnostic operation that takes a plurality of memory devices of the DSN offline; and a task that is executed across a plurality of nodes of the DSN substantially simultaneously;
    and wherein the determining whether the metadata from one or more of the plurality of managing units indicates that one or more distributed computing systems is executing the high-risk operation during the global upgrade comprises determining that the one or more in-progress operations includes a software error or bug based on a comparison of the metadata to a knowledge base including information regarding potentially high-risk operations.

11. The distributed storage network of claim 10, wherein the high-risk operation is an operation having more than a pre-determined probability of outage.

12. The distributed storage network of claim 10, wherein the software update procedure is a global software upgrade.

13. The distributed storage network of claim 12, wherein the global coordinator determines that the global software upgrade includes one or more software errors.

* * * * *